United States Patent
Straub et al.

(10) Patent No.: US 9,885,866 B2
(45) Date of Patent: Feb. 6, 2018

(54) MIRROR SYSTEM AND PROJECTION DEVICE

(71) Applicant: Robert Bosch GmbH, Stuttgart (DE)

(72) Inventors: Rainer Straub, Ammerbuch (DE); Kerrin Doessel, Stuttgart (DE); Johannes Baader, Freiburg (DE); Frederic Njikam Njimonzie, Reutlingen (DE); Joerg Muchow, Reutlingen (DE); Frank Schatz, Kornwestheim (DE); Helmut Grutzeck, Kusterdingen (DE); Simon Armbruster, Budapest (HU); Zoltan Lestyan, Martonvasar (HU); Stefan Leidich, Rutesheim (DE); Jochen Franz, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/118,777

(22) PCT Filed: Jan. 21, 2015

(86) PCT No.: PCT/EP2015/051105
§ 371 (c)(1),
(2) Date: Aug. 12, 2016

(87) PCT Pub. No.: WO2015/121037
PCT Pub. Date: Aug. 20, 2015

(65) Prior Publication Data
US 2017/0052363 A1 Feb. 23, 2017

(30) Foreign Application Priority Data
Feb. 17, 2014 (DE) .......... 10 2014 202 861
Apr. 28, 2014 (DE) .......... 10 2014 207 891

(51) Int. Cl.
G02B 26/08 (2006.01)
G02B 26/10 (2006.01)
(Continued)

(52) U.S. Cl.
CPC ......... *G02B 26/085* (2013.01); *G02B 7/1821* (2013.01); *G02B 26/105* (2013.01); *G03B 21/142* (2013.01)

(58) Field of Classification Search
CPC .. G02B 26/085; G02B 26/105; G02B 7/1821; G03B 21/142
(Continued)

(56) References Cited

U.S. PATENT DOCUMENTS 4,919,500 A * 4/1990 Paulsen .................. G02B 26/08
310/321
5,949,544 A * 9/1999 Manning .................. G01J 3/02
356/452
(Continued)

FOREIGN PATENT DOCUMENTS

DE 102012206269 A1 10/2013
DE 102012206291 A1 10/2013

OTHER PUBLICATIONS

International Search Report dated Apr. 15, 2015, of the corresponding International Application PCT/EP2015/051105 filed Jan. 21, 2015, 3 pages.

*Primary Examiner* — James Phan
(74) *Attorney, Agent, or Firm* — Norton Rose Fulbright US LLP; Gerard Messina

(57) ABSTRACT

A mirror system including a mirror that is mounted in a manner that permits oscillation, having a coil and at least one first spring that intercouples the mirror and the coil in a
(Continued)

way that allows the coil to be placed as a counterweight to the oscillating mirror. Also a corresponding projection device.

16 Claims, 17 Drawing Sheets

(51) Int. Cl.
 *G02B 7/182* (2006.01)
 *G03B 21/14* (2006.01)
(58) Field of Classification Search
 USPC .......................................... 359/196.1–226.2
 See application file for complete search history.

(56) References Cited

U.S. PATENT DOCUMENTS

| | | |
|---|---|---|
| 7,990,595 B1 | 8/2011 | Chou et al. |
| 2007/0047046 A1 | 3/2007 | Ji |
| 2008/0239445 A1 | 10/2008 | Ando |
| 2013/0250388 A1 | 9/2013 | Nozaki |

\* cited by examiner

MIRROR SYSTEM AND PROJECTION DEVICE

FIELD

The present invention relates to a mirror system and to a corresponding projection device.

BACKGROUND INFORMATION

Projectors are used today in a multitude of applications. Projectors can be used for presentations or for projecting a film, for example.

Different technologies are used for projecting images or videos. Light sources can be configured behind one or a plurality of LCD displays through which the light passes, for example. Thus, the image shown on the LCD display can be projected onto a screen, for example.

Alternatively, micromirrors can be used for constructing an image, for example. A micromirror-based projector has one or a plurality of micromirrors that are irradiated by a light source, for example, a laser. To project different image contents, these micromirrors are excited to an oscillation. Depending on the amplitude of the oscillation, respectively the position of the mirror, the laser beam is either reflected on or not reflected off of the projection surface.

Such micromirrors are usually resonantly excited to an oscillation. Excitations of the mirror thereby occur in oscillatory rotary motion, for example.

The oscillatory rotary motion is advantageous since light, for example, a laser beam, can be used here for a long-range deflection over small angles. A rotationally oscillating system is thereby used for the excitation.

The decoupling of the vibrational energy and the associated high damping of the oscillating system, which lead to an increased energy demand, are typically disregarded. Also disregarded is the excitation by external oscillations.

For example, if such a system is used in a cell phone as a deflection unit for generating images, and if a speaker is simultaneously active in this cell phone (for example, when video films are played back), then, by transmitting acoustic oscillations (possibly even through air oscillations), the speaker can excite the mirror deflection unit in one of the eigenmodes thereof and thereby disturb the construction of the image.

U.S. Patent Application Publication No. 2013/0250388 A1, for example, describes a resonantly excited mirror.

SUMMARY

The present invention relates to a mirror system and a projection system.

In accordance with the present invention, a mirror system is provided which includes a mirror that is mounted in a manner that permits oscillation, having a coil and at least one first spring that intercouples the mirror and the coil in a way that allows the coil to be placed as a counterweight to the oscillating mirror.

A projection device is also provided which includes a light source and having at least one mirror system according to the present invention and a control for controlling the at least one mirror system.

Conventional mirror systems are inherently high damping, so that energy requirements are considerable. Moreover, conventional mirror systems are sensitive to external disturbances.

The present invention takes this realization into consideration and of provides a novel mirror system whose energy demand will be low and which will be insensitive to external disturbances.

To that end, the present invention has a mirror system that includes a mirror. A coil is coupled to this mirror by a first spring. The coil thereby serves as a counterweight to the mirror.

The mirror and the coil, which are intercoupled by the first spring, form a singly resonant system, where the coil and the spring oscillate at the same frequency.

The present invention advantageously makes possible a resonant decoupling of the singly resonant system from the surrounding assembly and connection technology, also referred to as "packaging."

In comparison to conventional doubly resonant systems, for example, the singly resonant system of the present invention is insensitive to spring tolerances.

Advantageous specific embodiments and refinements are derived from the description below, with reference being made to the figures.

In one specific embodiment, the mirror is designed to oscillate rotationally. In addition, the at least one first spring couples the mirror and the coil in a way that allows the coil to oscillate counter to the moving direction of the mirror. A singly resonant system is thereby very readily provided.

In another specific embodiment, the mirror system includes a frame and at least one second spring, in particular a spring that is flexurally weak or soft in at least one direction, that couples the frame to the mirror and/or to the coil and/or to the at least one first spring. If the mirror and/or the coil and/or the at least one first spring, thus the singly resonant system, are/is coupled to the frame via a second spring, the singly resonant system is decoupled from external mechanical conditions, in particular in the case of a soft spring. In addition, only a very small amount of oscillation energy is coupled out into the surrounding packaging.

In one specific embodiment, the second spring is soft in a way that allows it to hold the mirror and the coil in position, but only negligibly influence the resonant frequency of the singly resonant frequency.

In another specific embodiment, the coil has a coil form, in particular a coil form having a cavity, and a coil winding that is placed on the coil form. The cavity makes it possible to reduce the mass of the coil form, whereby the movement amplitude of the coil form may be increased. This enhances the drive efficiency.

In another specific embodiment, the cavity has walls or ribs. The walls or ribs impart mechanical stability to the cavity if the particular application requires it.

In one specific embodiment, the need for the cavity at the end of the coil form is eliminated. Depending on the configuration of the singly resonant system, a compensating mass may be thereby formed that reduces the tilting motion of the coil form, in the case that the coil form is to execute a linear motion.

Another specific embodiment provides that the at least one first spring and the coil be configured in a first plane. In addition, the mirror resides above the first plane in a second plane that is disposed parallel to the first plane; the mirror, in particular, being coupled via a web of a predetermined length to the at least one first spring. The mirror movement may be very accurately defined by configuring the mirror in the second plane, while the coil resides in the first plane, and by using the web to adjust the distance between the two planes. For example, it is thereby possible to set the mirror into a rotational motion, while the coil merely executes an approximately linear motion.

Another specific embodiment provides for the at least one first spring to have four spring arms that are meander-shaped and are coupled at the ends thereof to the web.

Another specific embodiment provides that the at least one first spring feature two spring arms that are circular in shape and are coupled at one end thereof to the web.

In accordance with another specific embodiment, at the ends thereof that are not coupled to the web, the spring arms are coupled to a connecting element that couples the at least one first spring to the coil. Alternatively, at the ends thereof that are not coupled to the web, the spring arms are directly coupled to the coil.

The mentioned configurations of the first spring make possible a variable, application-specific design of the singly resonant system.

Another specific embodiment provides that the second spring be designed as a leaf spring.

In another specific embodiment, the mirror system includes a housing that surrounds at least the mirror, the coil, and the at least one first spring; the housing, in particular having a lower air pressure than the ambient environment around the housing, in particular a partial vacuum, and being hermetically tightly sealed. The low air pressure is conducive to the movement of the mirror and the coil.

Another specific embodiment provides that the housing disposed over the mirror be at least partially transmissive to laser beams. Alternatively, the housing disposed over the mirror has a window, in particular a window that is positioned obliquely relative to the first plane or the second plane and is transmissive to laser beams. The mirror system according to the present invention may be thereby used with an external light source, for example, a laser. In addition, the obliquely positioned window inhibits reflections.

In another specific embodiment, the mirror system has a magnet, in particular a permanent magnet that is configured on the housing in a way that allows the coil to reside in the magnetic field of the magnet. This makes it possible to excite the coil to move without physical contact.

Another specific embodiment provides that the mirror system have a flux deflector that is configured on the magnet in a way that allows the magnetic field of the magnet to permeate the first plane in the area of the coil nearly vertically or nearly horizontally. Thus, the efficiency of the mirror system may be optimized as a function of the desired coil movement direction.

In another specific embodiment, the mirror system has at least one first measuring device, in particular at least one piezoresistive resistor that is designed for capturing the deflection of the mirror and that is mounted, in particular on the at least one first spring. This makes it possible to accurately record the mirror movement.

In one specific embodiment, supply lines, which supply electric power to the coil, are configured on the second spring. This makes possible a simple connection of the coil to a control device or to an electric power source.

In another specific embodiment, the mirror system includes at least one second measuring device, in particular at least one piezoresistive resistor that is designed for capturing the deflection of the group composed of the mirror and/or the coil and/or of the at least one first spring and, in particular that is configured on the at least one second spring. The makes it possible to record the movement of the singly resonant system of the present invention.

In another specific embodiment, the mirror system has a control device that is designed to control the coil in response to the measured values of the at least one second measuring device in a way that allows the group composed of the mirror and/or the coil and/or of the at least one first spring to be excited with a predefined frequency, or the coil to be controlled in a way that allows external excitations to be actively counteracted. Thus, for example, speckling of the image may be reduced with considerable variability. It is also possible to actively damp external excitations.

In another specific embodiment, the mirror has a base plate on whose top side, the mirror surface is configured and, on whose bottom side, a stiffening element is configured that is designed for mechanically stabilizing the mirror. This ensures that acceleration forces do not excessively deform the mirror, even in the case of highly dynamic movements.

The above embodiments and refinements may be combined in any desired, useful manner. Other possible embodiments, refinements and implementations of the present invention also include combinations that are explicitly named neither previously nor in the following with regard to exemplary embodiments of described features of the present invention. In particular, one skilled in the art would also add individual aspects as improvements or supplements to the particular basic design of the present invention.

BRIEF DESCRIPTION OF THE DRAWINGS

The present invention is explained below on the basis of the exemplary embodiments shown in the schematic figures.

In all of the figures, like or functionally equivalent elements and devices—provided that nothing else is specified—are provided with the same reference numerals.

DETAILED DESCRIPTION OF EXAMPLE EMBODIMENTS

Figure 1:
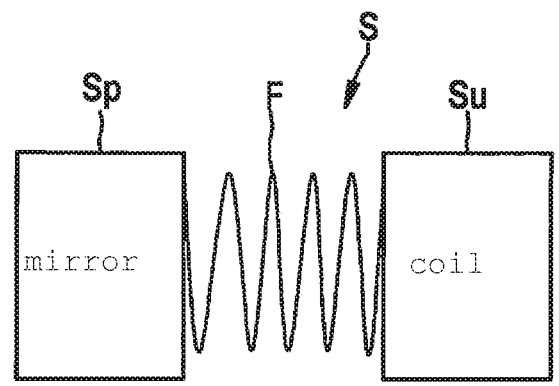
FIG. 1 shows a block diagram of a specific embodiment of a mirror system according to the present invention.

FIG. 1 shows a block diagram of a specific embodiment of a mirror system S according to the present invention.

Mirror system S has a mirror Sp that is coupled by a spring F to a coil Su.

Coil Su is thereby configured to form a counterweight to mirror Sp.

Figure 2:
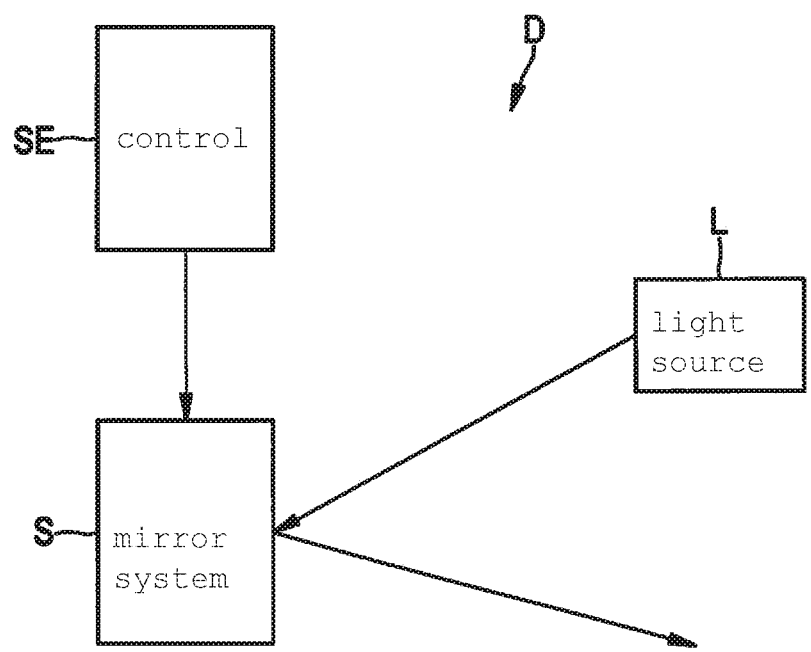
FIG. 2 shows a block diagram of a specific embodiment of a projection device according to the present invention.

FIG. 2 shows a block diagram of a specific embodiment of a projection device P according to the present invention.

Projection device P features a mirror system S that is coupled to a control SE. A light source L is also provided that irradiates mirror system S. The light beam of light source L is reflected by mirror system S. The laser is also controlled by control device SE, thereby making it possible for a laser to be controlled as a function of the tilt angle of the mirror. This makes it possible, for example, for images to be projected by using a second laser.

Figure 3:
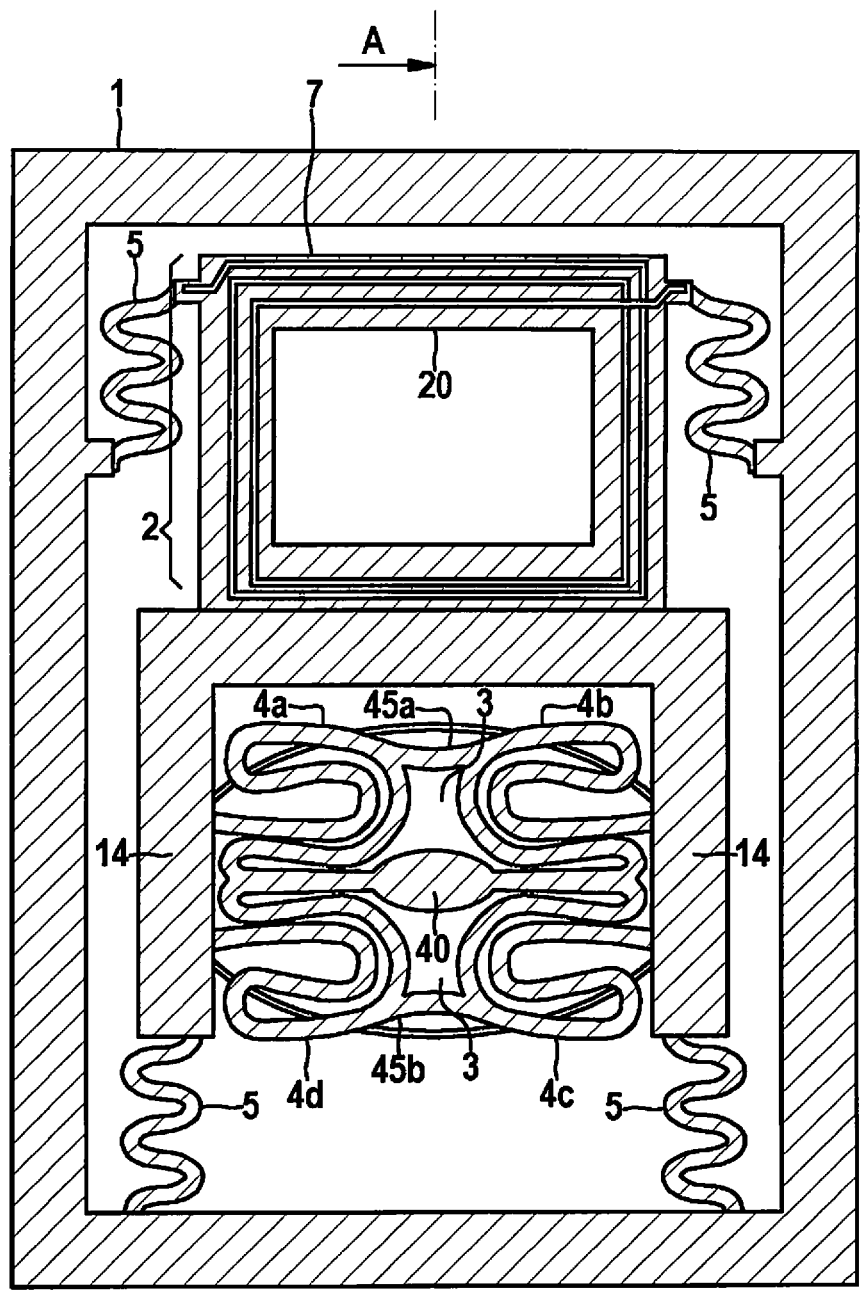
FIG. 3 shows a schematic representation of a specific embodiment of a mirror system according to the present invention.

FIG. 3 shows a schematic representation of a specific embodiment of a mirror system S according to the present invention.

Mirror system S has a frame 1 for connecting mirror system S, for example, to a housing and the external packaging.

Configured within frame 1 is a coil 20 that features a coil form 2 and a coil winding 7. Also configured within frame 1 is a mirror 3 that is coupled via first spring F and a connecting element 14 to coil 20.

Spring F is not shown separately. Rather, the four spring arms 4a, 4b, 4c and 4d of spring F are shown that couple mirror 3 by a web 41 (see FIG. 4) and region 40 thereof to connecting element 14. Web 41 is thereby only coupled in region 40 to the four spring arms 4a, 4b, 4c and 4d. Also provided in FIG. 3 are connecting webs 45a, 45b that intercouple spring arms 4a and 4b and spring arms 4c and 4d, respectively. The connecting webs are optional.

The singly resonant system composed of coil 20, mirror 3, connecting elements 14 and spring arms 4a-4d is coupled via four soft springs 5, which are likewise meander-shaped, to frame 1. Two of springs 5 are coupled to coil form 2. Two other springs 5 are coupled to the ends of U-shaped connecting element 14 that surrounds spring arms 4a-4d.

Springs 5 are soft in a way that allows them to hold mirror 3 and coil 20 in position, but only negligibly influence the resonant frequency of the oscillation of the singly resonant system.

FIG. 3 shows the second plane, within which mirror 3 resides, below the first plane, within which coil 20 and spring arms 4a-4d reside. Thus, mirror 3 is disposed underneath coil 20 and spring arms 4a-4d.

Spring arms 4a, 4b, 4c and 4d of FIG. 3 are meander-shaped and extend from web 40, which resides in the middle of the four spring arms 4a, 4b, 4c and 4d, to connecting element 14, which surrounds web 40 and spring arms 4a-4d in a U shape.

Indicated in the middle of mirror system S of FIG. 3 from top to bottom is an axis of intersection A that symmetrically divides the mirror system in the middle thereof.

Figure 4:
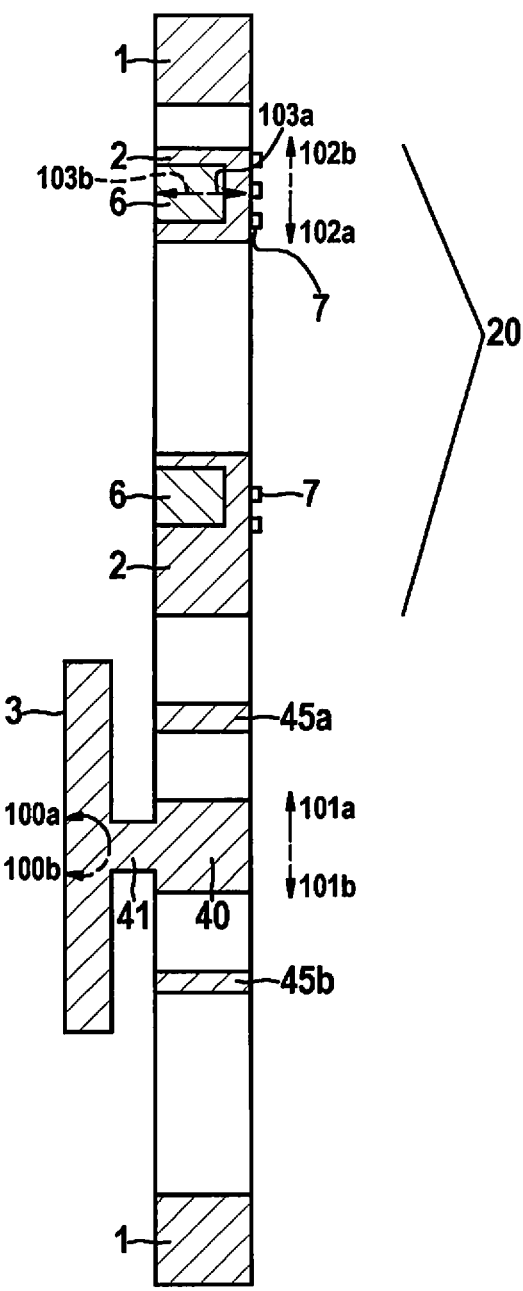
FIG. 4 shows a schematic representation of a specific embodiment of a mirror system according to the present invention.

FIG. 4 shows a schematic representation of a specific embodiment of a mirror system S according to the present invention in a side view along axis of intersection A of FIG. 3.

Readily apparent in FIG. 4 is how web 41 positions the mirror in a second plane that resides above the first plane of spring arms 4a, 4b, 4c and 4d and of coil 20.

Also shown in FIG. 4 are directions of movement 100a and 100b of mirror 3, as well as directions of movement 101a and 101b of region 40, and directions of movement 102a, 102b and 103a, 103b of coil 20.

Directions of movement 100a and 100b of mirror 3 indicate a rotational movement about the center of mirror 3. Thus, mirror 3 oscillates resonantly about the longitudinal axis thereof. Directions of movement 101a and 101b indicate a linear movement of region 40 in the first plane. Directions of movement 102a, 101b indicate a linear movement of coil 20 in the first plane in the direction of mirror 3. Finally, directions of movement 103a and 103b indicate a linear is movement that projects out of the first plane orthogonally to directions of movement 102a and 102b.

The principle of operation of mirror system S will be clarified in the following.

If the mirror oscillates in direction 100a, the bottom region of web 41 and thus region 40 moves through the spacing between the mirror and spring arms 4a through 4d mainly linearly in direction 101a. For that purpose, coil 20 executes a compensating movement in opposite direction 102a. Because coil 20 is disposed at a substantial distance from axis of rotation 100a, 100b, it essentially executes a linear movement 102a, 102b and only still a small tilting movement 103a, 103b.

Cavity 6, which, in FIG. 4, is located in coil form 2, serves to reduce the coil form mass, thereby increasing the amplitude of movement of coil form 2, thereby, in turn, enhancing the drive efficiency.

Connecting webs 45a and 45b also serve to enhance the drive efficiency and further the translation of the rotational oscillatory motion of mirror 3 into the linear drive motion of coil 20 or vice versa.

Figure 5:
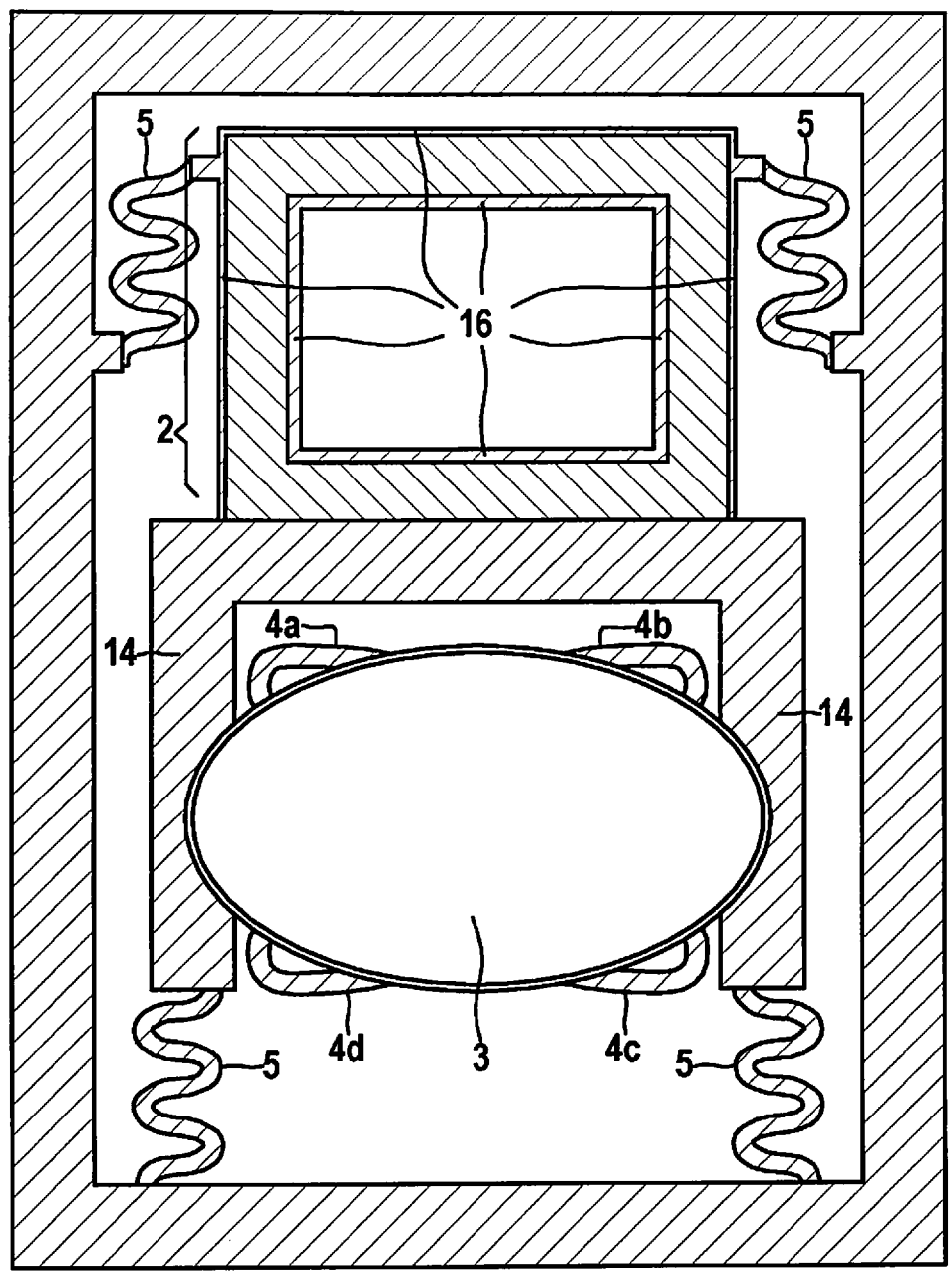
FIG. 5 shows a schematic representation of a specific embodiment of a mirror system according to the present invention.

FIG. 5 shows a schematic representation of a specific embodiment of a mirror system S according to the present invention in a plan view. In contrast to FIG. 3, the second plane, within which mirror 3 resides, is thus disposed above the first plane, within which coil 20 and spring arms 4a-4d reside.

It is readily discernible in FIG. 5 that mirror 3 has an oval shape. Other forms of mirror 3 are possible in further specific embodiments thereof.

In one specific embodiment, a cavity 6 for reducing the mass of coil form may be located in coil form 2. Cavity 6 may be configured in any desired form. The remaining stationary cavity walls 16 are used for stabilization and, in one specific embodiment, may be ribbed, or if there is no need for stabilization, also be entirely eliminated.

Figure 6:
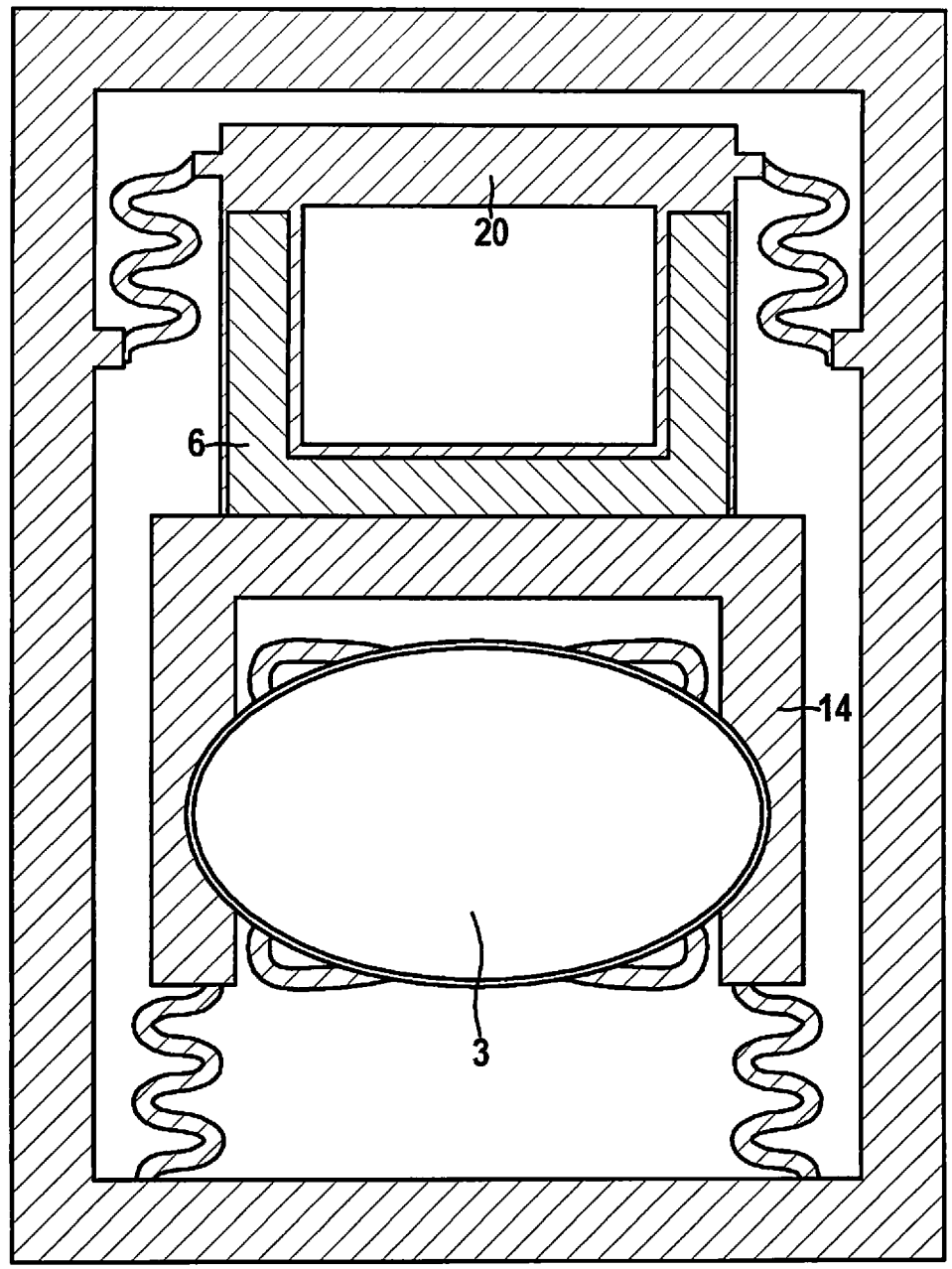
FIG. 6 shows a schematic representation of a specific embodiment of a mirror system according to the present invention.

FIG. 6 shows a schematic representation of a specific embodiment of a mirror system S according to the present invention that is based on the mirror system of FIG. 5.

In FIG. 6, coil 20 merely features cavity 6 on three sides of coil form 2. That side of rectangular coil form 2 which is the furthest from mirror 3 does not have any cavity 6.

By eliminating cavity 6 at the end of coil form 2, a compensating mass may be formed that reduces the tilting motion in moving direction 103a, 103b of coil form 2.

Figure 7:
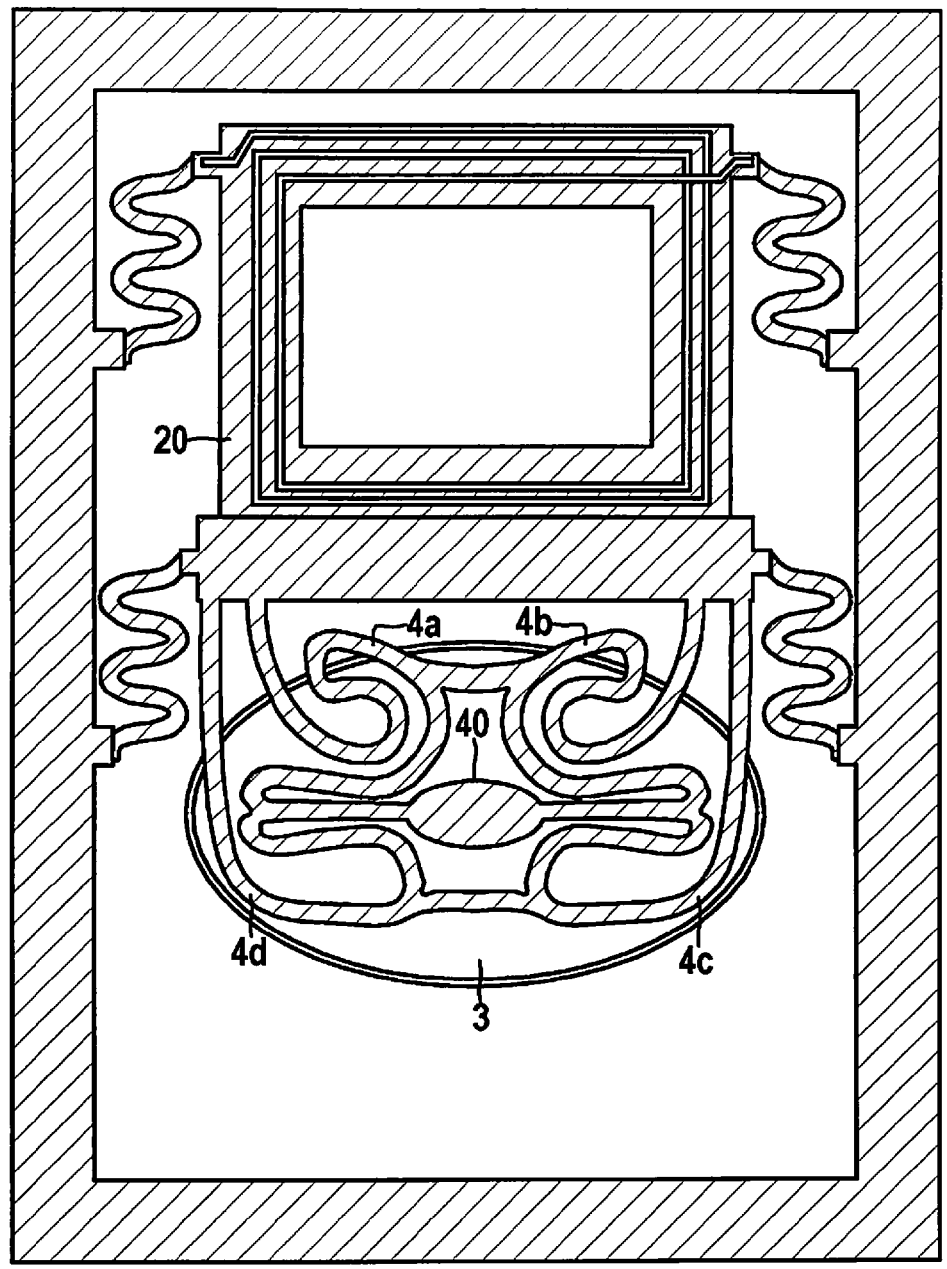
FIG. 7 shows a schematic representation of a specific embodiment of a mirror system according to the present invention.

FIG. 7 shows a schematic representation of a specific embodiment of a mirror system S according to the present invention that is based on the mirror system of FIG. 3.

Connecting element 14, which, in FIG. 3, couples spring arms 4a-4d to coil 20, is eliminated in FIG. 7. Spring arms 4a-4d extend directly from region 40 to coil form 2.

In one variant, spring arms 4a-4d shown in image 7, may be replaced by a leaf spring.

Figure 8:
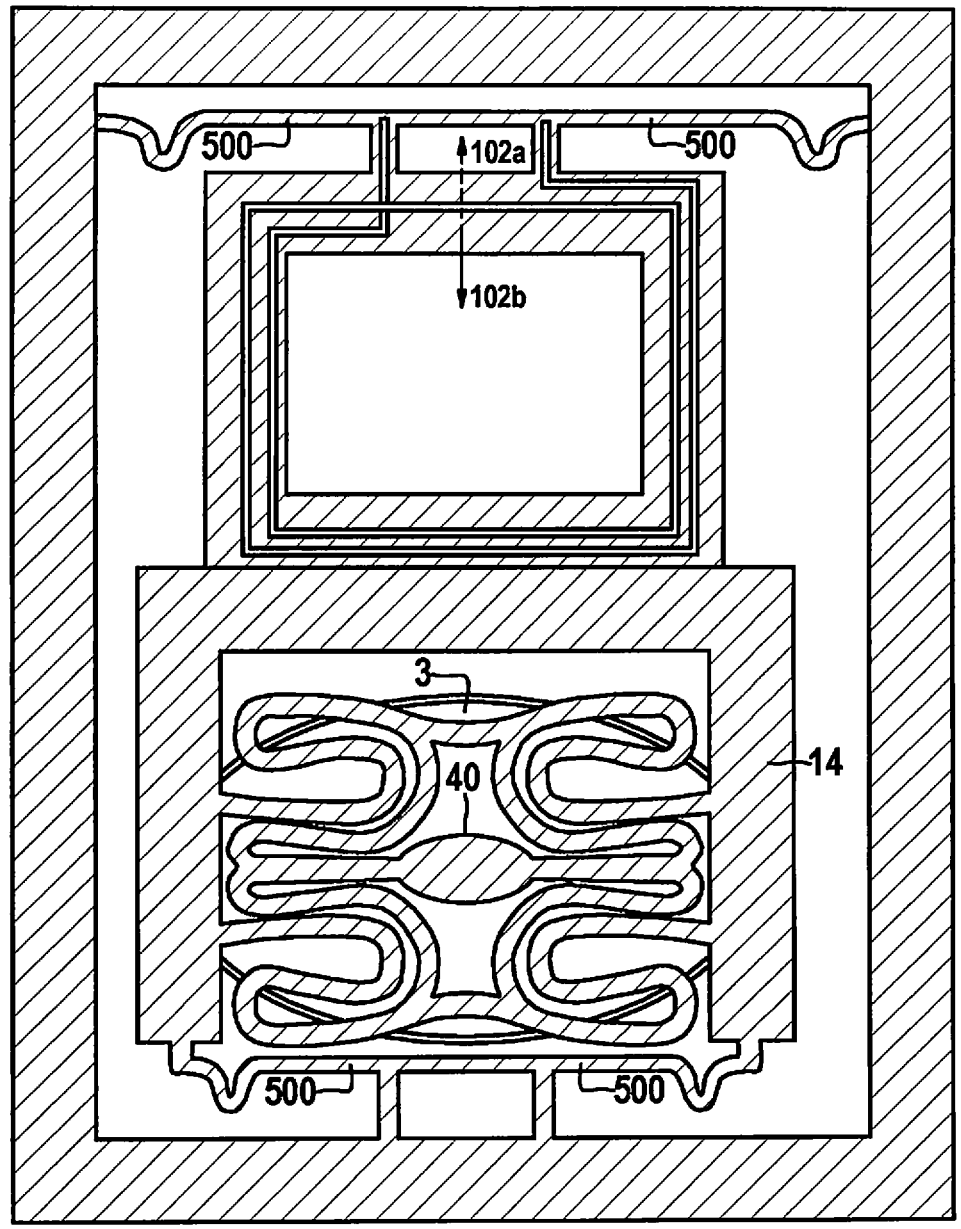
FIG. 8 shows a schematic representation of a specific embodiment of a mirror system according to the present invention.

FIG. 8 shows a schematic representation of a specific embodiment of a mirror system S according to the present invention that is based on the mirror system of FIG. 3.

In contrast to FIG. 3, no second springs 5 are provided that lead in a meander shape from coil form 2, respectively the ends of connecting element 14, directly to frame 1.

Rather, frame 1 in FIG. 8 features other spring elements 500 that are designed to provide the least possible hindrance to a movement of the singly resonant system in moving direction 102a, 102b. However, the spring elements also block a movement transversely to moving direction 102a, 102b.

This is accomplished by the special design of spring elements 500, which are as soft as possible in direction 102a, 102b, but as stiff as possible in all other directions.

Figure 9:
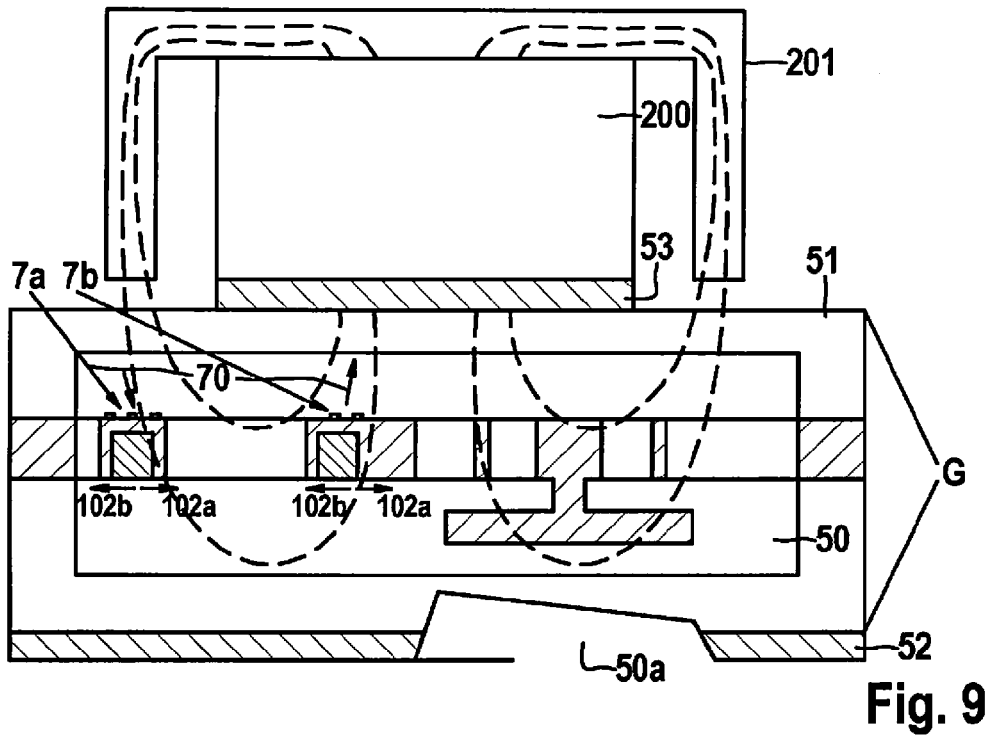
FIG. 9 shows a schematic representation of a specific embodiment of a mirror system according to the present invention.

FIG. 9 shows a schematic representation of a specific embodiment of a mirror system S according to the present invention that is based on the mirror system of FIG. 3.

Mirror system S shown in image 3 is provided in FIG. 9 with a housing G that is composed of two caps 50, 51. Caps 50, 51 are designed to hermetically tightly seal mirror 3, and the housing optionally features a low internal pressure relative to the ambient pressure, respectively has a partial vacuum.

Moreover, cap 50 is laser beam transmissive or features a window 50a, which is also optionally obliquely angled to avoid reflections in the image ray path.

Located underneath cap 50 is a plastics adhesive 52 for fixing mirror system S in position on a substrate.

Mirror system S of FIG. 9 also features a magnet 200, which, for example, may likewise be fastened by adhesive 53 to the side of housing G facing away from mirror 3.

Adhesives 52 and 53, as well as the substrate may feature high damping properties. However, illustrated soft springs 5 (respectively springs 500 in FIG. 8) make these damping properties irrelevant, since they decouple the system, and, in the system itself, coil form 2 serves as a counter mass to the movement of mirror 3.

Singly resonant system is driven via coil windings 7 which reside in a permanent magnetic field of magnet 200.

Also configured on permanent magnets 200 of FIG. 9 is a flux deflector 201, so that the magnetic field lines of the magnetic field of permanent magnet 200 extend as orthogonally as possible through coil form 20, respectively coil branches 7a, 7b.

The field emerging from underneath the pole of magnet 200 must be directed to produce a force in the direction denoted in FIG. 8 by 102a, respectively 102b. For this, the field of the permanent magnet may be directed with the aid of flux deflector 201. The result is magnetic field direction 70 illustrated in FIG. 9 in the region of the coil. The force in direction 102a, 102b is then obtained in conjunction with the direction of the current field of coil branches 7a, 7b. Coil branch 7a thereby naturally has the opposite current direction of coil branch 7b.

To set mirror 3 into oscillation, the current field direction of coil 20 changes or is driven in a pulsed operation.

Figure 10:
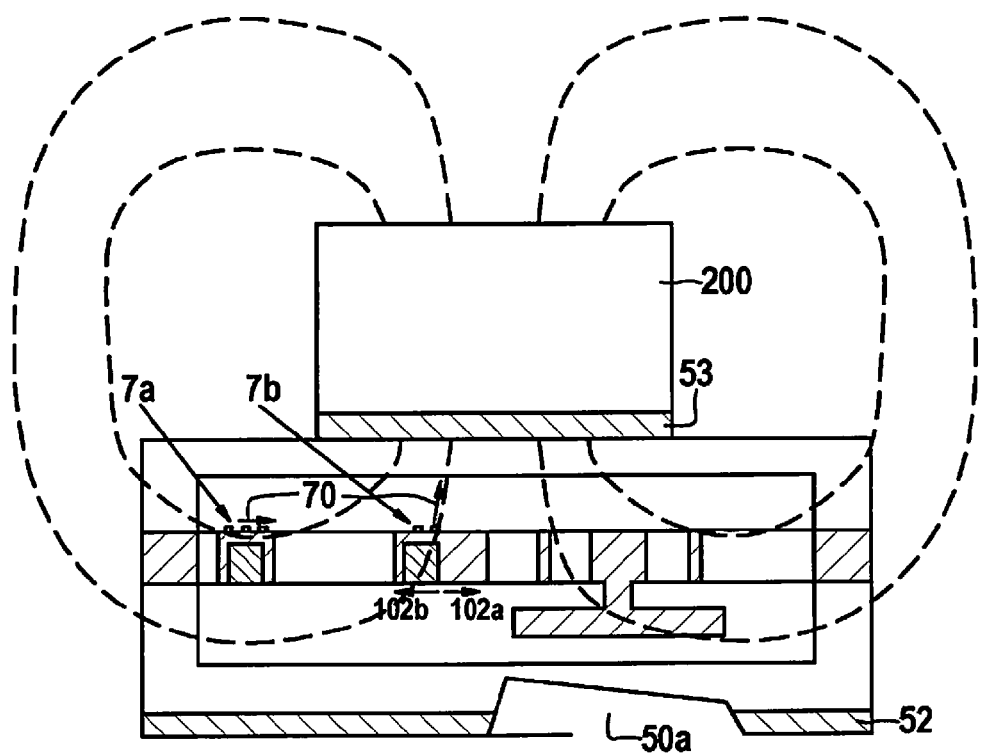
FIG. 10 shows a schematic representation of a specific embodiment of a mirror system according to the present invention.

FIG. 10 shows a schematic representation of a specific embodiment of a mirror system S according to the present invention that is based on the mirror system of FIG. 9.

Mirror system S of FIG. 10 does not have a flux deflector 201. In this variant, it is mainly coil branch 7b that produces the forces in direction of movement 102a, 102b. In addition, orthogonal movements of outer coil branch (103a and 103b) may also be used. The field shape of FIG. 10 may also be realized using a flux deflector.

Figure 11:
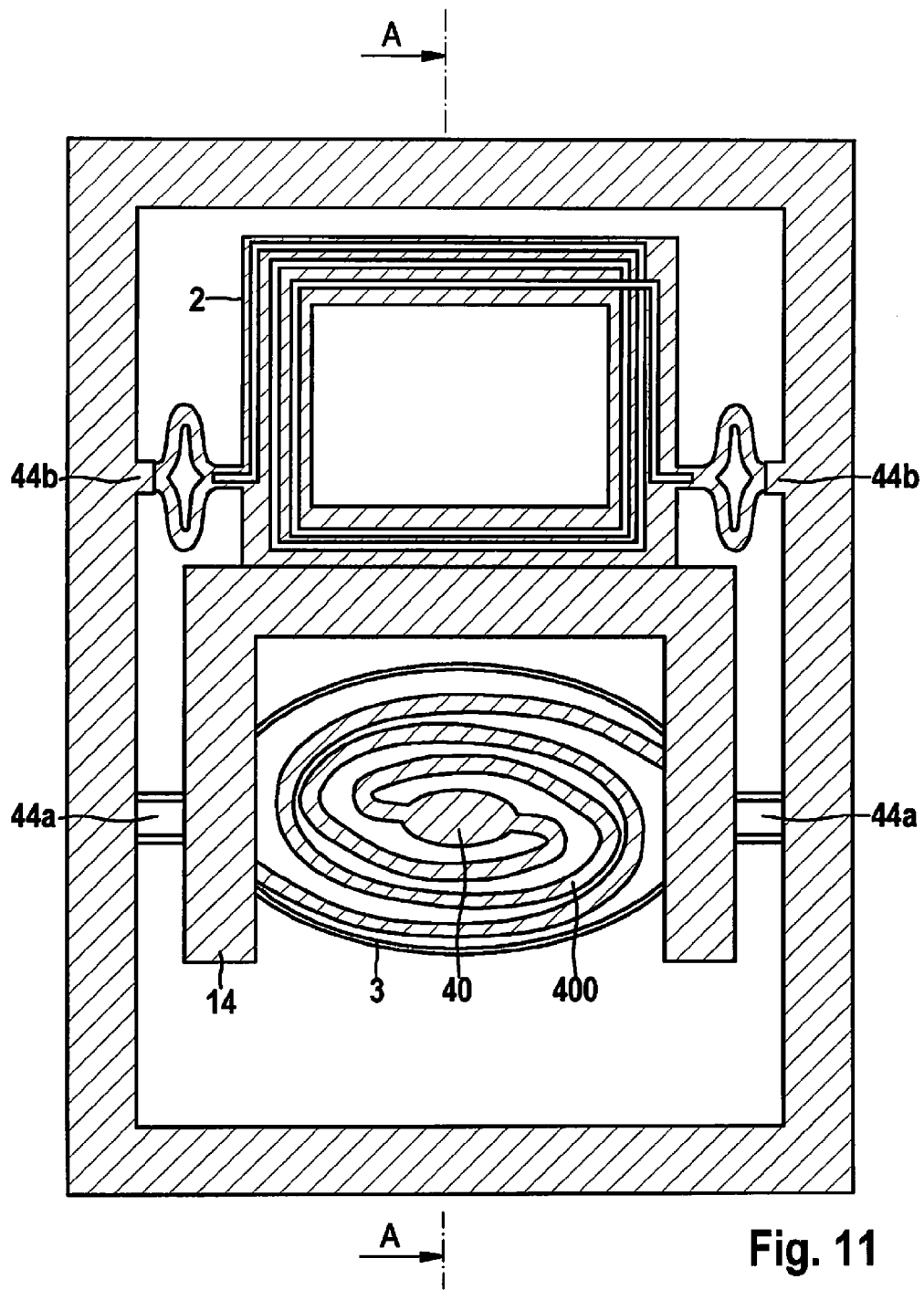
FIG. 11 shows a schematic representation of a specific embodiment of a mirror system according to the present invention.

FIG. 11 shows a schematic representation of a specific embodiment of a mirror system S according to the present invention, viewed from the side facing away from the mirror.

In FIG. 11, spring F is configured as helical spring 400.

Because of helical spring 400, coil form 2 moves in a shape that differs from that of FIG. 3.

If mirror 3 oscillates in direction 100a, 100b, region 40 moves, as before, in direction 101a, 101b. The end of coil form 2 itself describes a movement essentially orthogonally to the extent of coil form 2, direction of movement 1002a and 1002b in FIG. 12, so that the rotational movement of mirror 3 is compensated by a tilting movement of coil 20.

The movement that differs from FIG. 4 is derived from the negligible stiffness of the helical spring in direction 101a, 101b.

Figure 13:
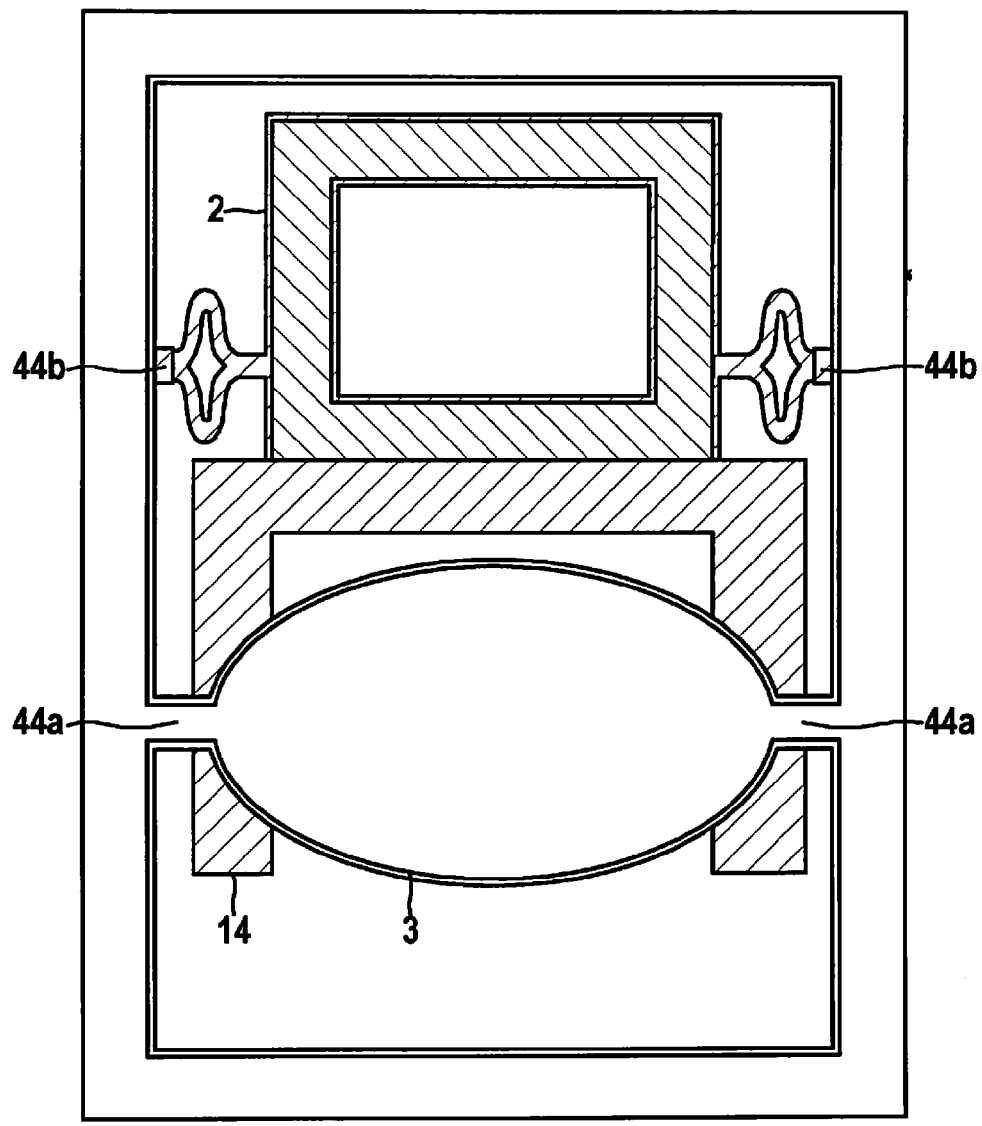
FIG. 13 shows a schematic representation of a specific embodiment of a mirror system according to the present invention.

The suspension must be accomplished by second springs that are torsionally weak, but as stiff as possible in all linear spatial directions. This is shown in FIGS. 11 and 13. Here, mirror 3 is connected by torsion springs 44a in the mirror plane itself to outer frames 1, and coil 20 is connected at the pivot point thereof by springs 44b to outer frames 1. It is self-evident that the system may also be connected using any soft springs, as in FIGS. 3-5; however, this increases the excitability in response to external oscillations.

In the same way as in FIG. 3, in FIG. 11, a line of intersection A is drawn in the middle of mirror system S.

Figure 12:
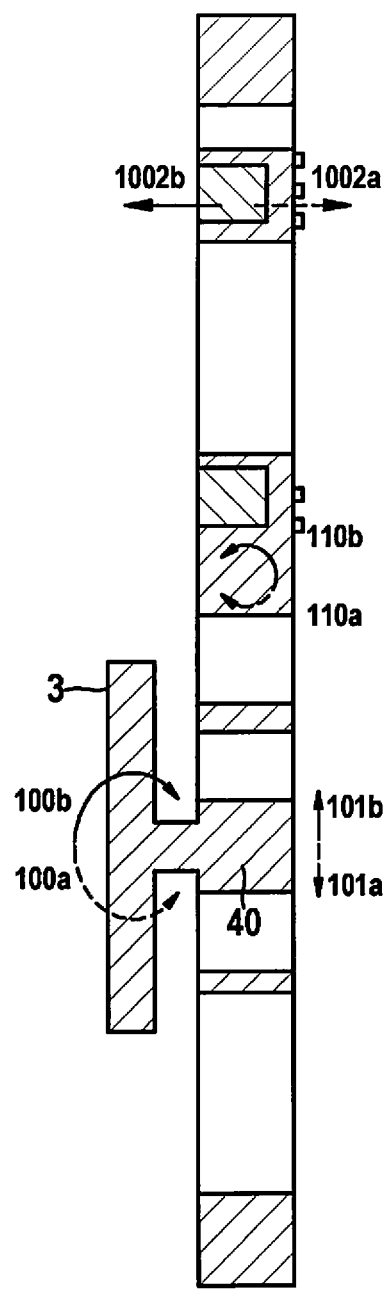
FIG. 12 shows a schematic representation of a specific embodiment of a mirror system according to the present invention.

FIG. 12 shows a schematic representation of a specific embodiment of mirror system S according to the present invention of FIG. 11 in a side view along axis of intersection A.

Figure 14:
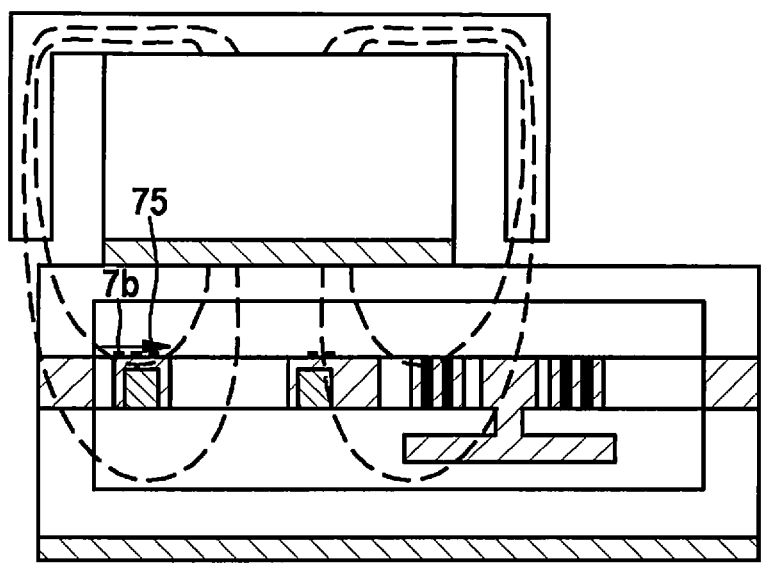
FIG. 14 shows a schematic representation of a specific embodiment of a mirror system according to the present invention.

The movement in direction 1002a and 1002b is a movement of the rear part of coil 20, which is the most distant from mirror 3, orthogonally to the first plane, and may be used for driving mirror 3, for example, through a permanent magnet-produced field in direction 75 [(sic.) 70], in combination with an alternating current in coil branch 7a. A corresponding configuration of magnet 200 is shown in FIG. 14.

Coil branch 7b remains inactive in direction 1002a, 1002b, since the magnetic field only acts orthogonally to direction 1002a, 1002b and is thus ineffective in the resonant excitation of the system.

It should also be noted that this system has a second pivot point due to directions of rotation 110a, 110b. Second pivot point is located at the part of coil 20 that is the most proximate to mirror 3.

If the system of FIGS. 11 and 12 is suspended at pivot points 100a,b and 110a,b, thus coupled by second springs 5 to frame 1, this minimizes an excitability in response to the influence of external oscillations.

In all specific embodiments of mirror system S, the feeding of current to coil 20, and the routing of signal lines may both be implemented via soft springs 5, respectively 500, respectively 44a and 44b which, for example, sense the mirror deflection due to the piezoresistive effect.

The magnitude of the oscillating mirror deflection may be sensed by first measuring device M1, designed as piezoresistive resistors, on springs 4a through 4d, respectively 400.

First measuring devices M2, designed as piezoresistive resistors, may also be used on soft springs 5, respectively 500, respectively 44a, 44b for sensing the oscillating mirror deflection. These first measuring devices M1 are preferably configured in the spring regions proximate to coil form 2 or connecting element 14.

In addition, second measuring devices M1, designed as piezoresistive resistors, may be introduced into soft springs 5, 500, respectively 44a, 44b to measure the deflection of the softly suspended, singly resonant system. These second measuring devices are preferably placed near outer frame 1. Such measuring resistors make it possible to not only use the magnet/coil system to excite mirror 3, but also to actively influence the deflection of the softly suspended mirror/coil system.

Besides the higher-frequency oscillation of the oscillating mirror, in one specific embodiment, the soft system may be excited at a low frequency, for example. This makes it possible to variably influence the image quality, thus, for example, the speckling of the image.

The slight low-frequency movement of mirror 3 makes it possible to reduce laser interferences that have a disturbing effect in the image observation. Moreover, the image may be variably despeckled as a function of the image content. Thus, for example, video sequences may be despeckled differently than static image contents. Static image contents could also be differently despeckled depending on whether they contain text or not.

In one specific embodiment, an external excitation may be actively counteracted by a feedback control system. This is to ensure that any impulses acting on mirror 3 or an acoustic source in the vicinity thereof do not influence the oscillation of mirror 3 and thus, the image quality.

FIG. 13 shows a schematic representation of the specific embodiment of mirror system S according to the present invention of FIGS. 11 and 12 in a plan view.

It is readily discernible in FIG. 13 that the singly resonant system composed of coil form 2 and mirror 3 is suspended once via springs 44a at the oscillation axis of mirror 3 and once via springs 44b at the end of coil form 2, which is the most proximate to mirror 3.

FIG. 14 shows a schematic representation of a specific embodiment of a mirror system S according to the present invention.

In mirror system S of FIG. 14, magnet 200 and flux deflector 201 are configured to allow that end of coil form 2, which features coil branch 7a, to be transversely penetrated by the magnetic field of magnet 200. This makes it possible for this end of coil form to move in moving direction 1002a and 1002b in response to energization of coil branch 7a.

Figure 15:
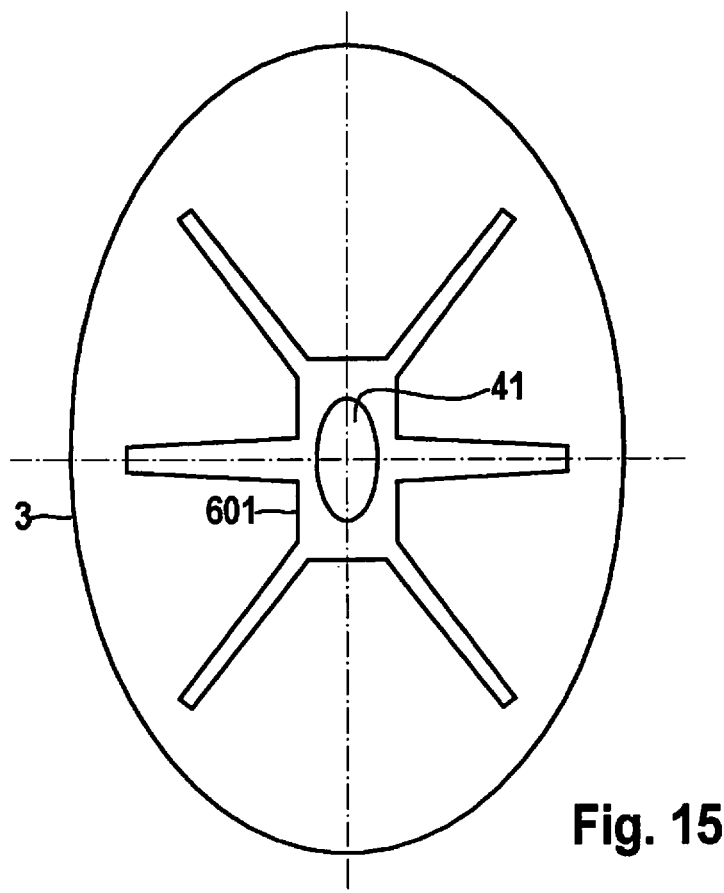
FIG. 15 shows a schematic representation of a specific embodiment of a mirror system according to the present invention.

FIG. 15 shows a schematic representation of a specific embodiment of a mirror 3 of a mirror system S according to the present invention.

Mirror 3 may be specially designed to ensure that it does not excessively deform in response to acceleration forces in the context of dynamic oscillating mirror movement. FIG. 15 shows a rib structure that may be applied to the bottom side of mirror 3.

In FIGS. 4 and 12, ribs 601 partially replace web 41 that is also used as a spacer to first spring F or spring arms 4a-4d.

The ribs extend radially outwardly from the center of mirror 3.

Figure 16:
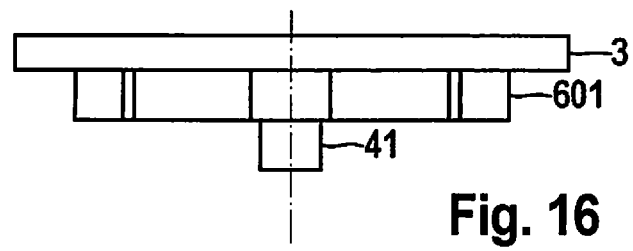
FIG. 16 shows a schematic representation of a specific embodiment of a mirror system according to the present invention.

FIG. 16 shows a schematic cross-sectional view of mirror 3 of FIG. 15.

In FIG. 16, it is discernible that the distance of the mirror to first spring 5 is only determined by web 41. Individual ribs 601 are shorter and are merely configured to have a thickness or depth that ensures the desired mechanical stability.

Figure 17:
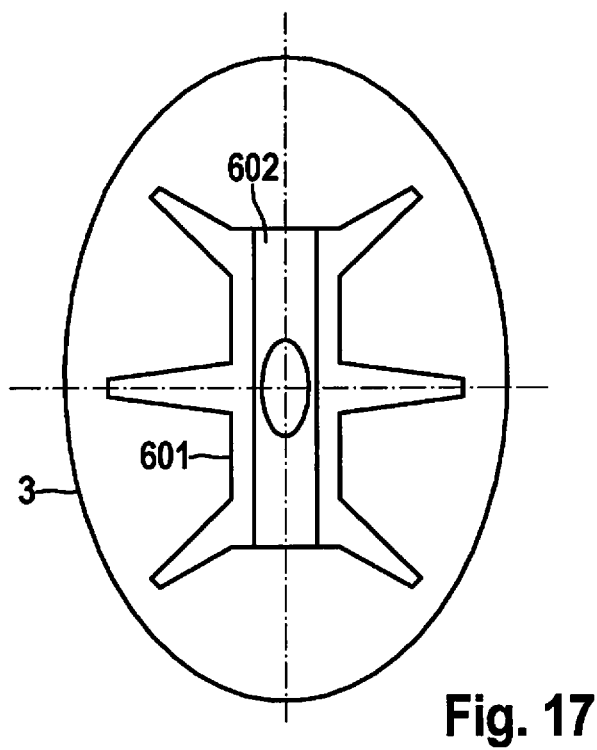
FIG. 17 shows a schematic representation of a specific embodiment of a mirror system according to the present invention.

FIG. 17 shows a schematic representation of another specific embodiment of a mirror 3 of a mirror system. S according to the present invention from below, thus from the side of mirror 3 facing away from the mirror surface.

In FIG. 17, the rib structure has a different design than in FIGS. 15 and 16. The rib structure essentially has a central bar 602 in T-section form, which extends nearly to the end of mirror 3 and parallel to the rotation axis of mirror 3. On the one hand, a small rotational inertia is thereby achieved; on the other hand, mirror 3 is further stabilized since the height in the central region is further increased.

Figure 18:
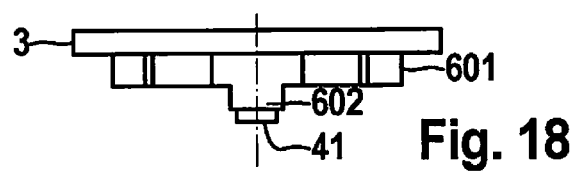
FIG. 18 shows a schematic representation of a specific embodiment of a mirror system according to the present invention.

FIG. 18 shows a schematic representation of mirror 3 of FIG. 17 in a sectional view.

Web 41, which functions as a spacer, has a lower height in FIG. 18 than in FIG. 16 since mirror 3 moves only little in the central region, so that the overall height is comparable to the height of mirror 3 in FIG. 16. However, mirror 3 in FIG. 18 is better stabilized against deformations.

Since T-section 602 is also disposed close to the axis of rotation, there is only an insignificant variation in the moment of rotational inertia between mirrors 3 of FIGS. 16 and 18.

Since rib 602 is mounted only in the central region of axis of rotation, ribs 601 must still be extended outwardly in order to stabilize the outwardly disposed part of mirror 3 as well. The number and the design of ribs 601 are dependent on the specific variant. The optimal position and form may be ascertained using a calculation program, for example.

Figure 19:
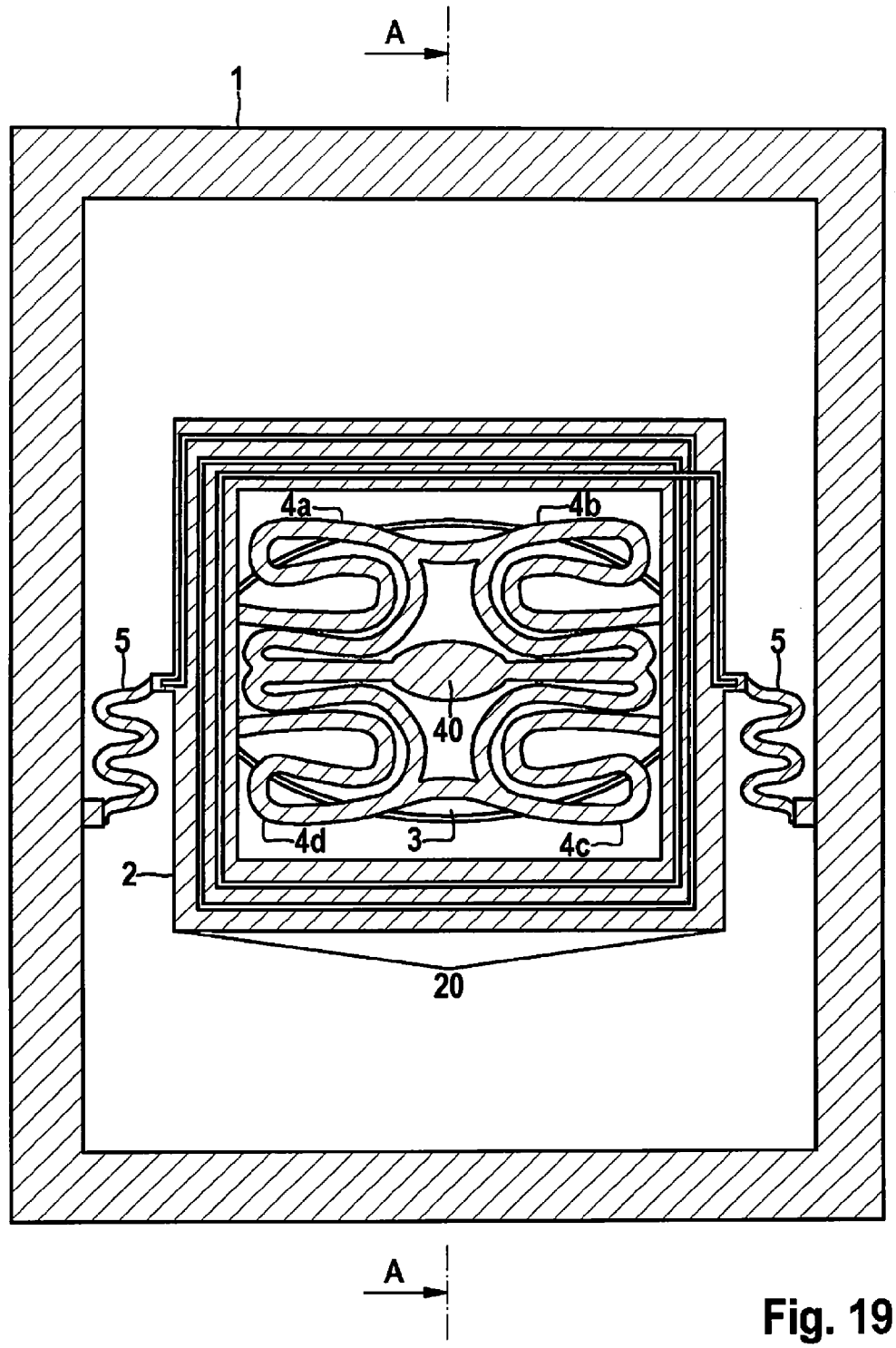
FIG. 19 shows a schematic representation of a specific embodiment of a mirror system according to the present invention.

FIG. 19 shows a schematic representation of a specific embodiment of a mirror system S according to the present invention.

In FIG. 19, the mirror is positioned in the middle of coil 20, thus above the same. Disposed in the interior of square coil form 2 in the first plane are spring arms 4a-4d, which contact region 40 of web 41 in order to connect mirror 3 to coil form 2. Coil form 2 is coupled by two second springs 5 to frame 1.

Figure 20:
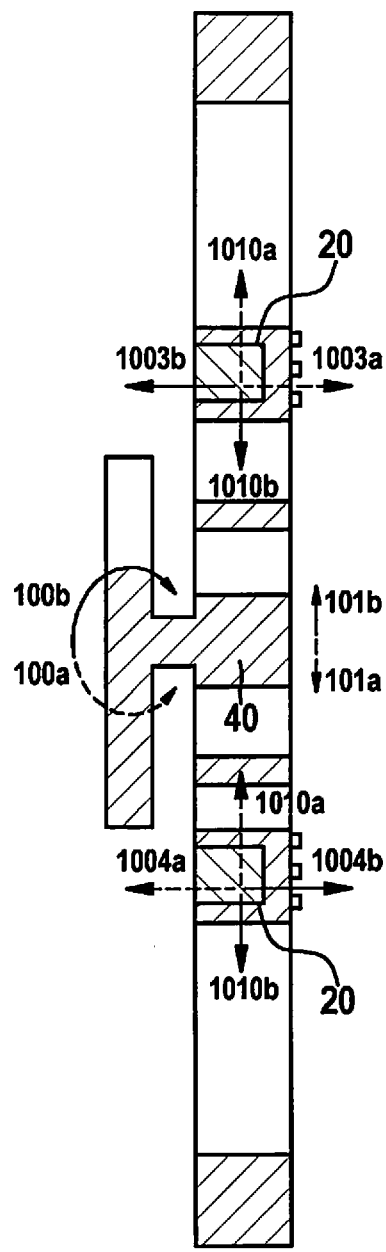
FIG. 20 shows a schematic representation of a specific embodiment of a mirror system according to the present invention.

FIG. 20 shows a schematic representation of the specific embodiment of mirror system S according to the present invention of FIG. 19 in a sectional view.

In the specific embodiment of FIGS. 19 and 20, coil form 2 performs oscillations counter-rotationally to mirror 3 and thereby makes it possible to avoid oscillation energy outcoupling via the packaging.

As previously described, the movement of mirror 3 is rotational in moving directions 100a, 100b, and, as previously described, region 40 of web 41 moves linearly in direction 101a, 101b. If the mirror moves in direction 100a, coil form 2 oscillates in opposite direction 1003a, 1004a. A slight movement of the coil form in direction 1010a, 1010b is possible.

Figure 21:
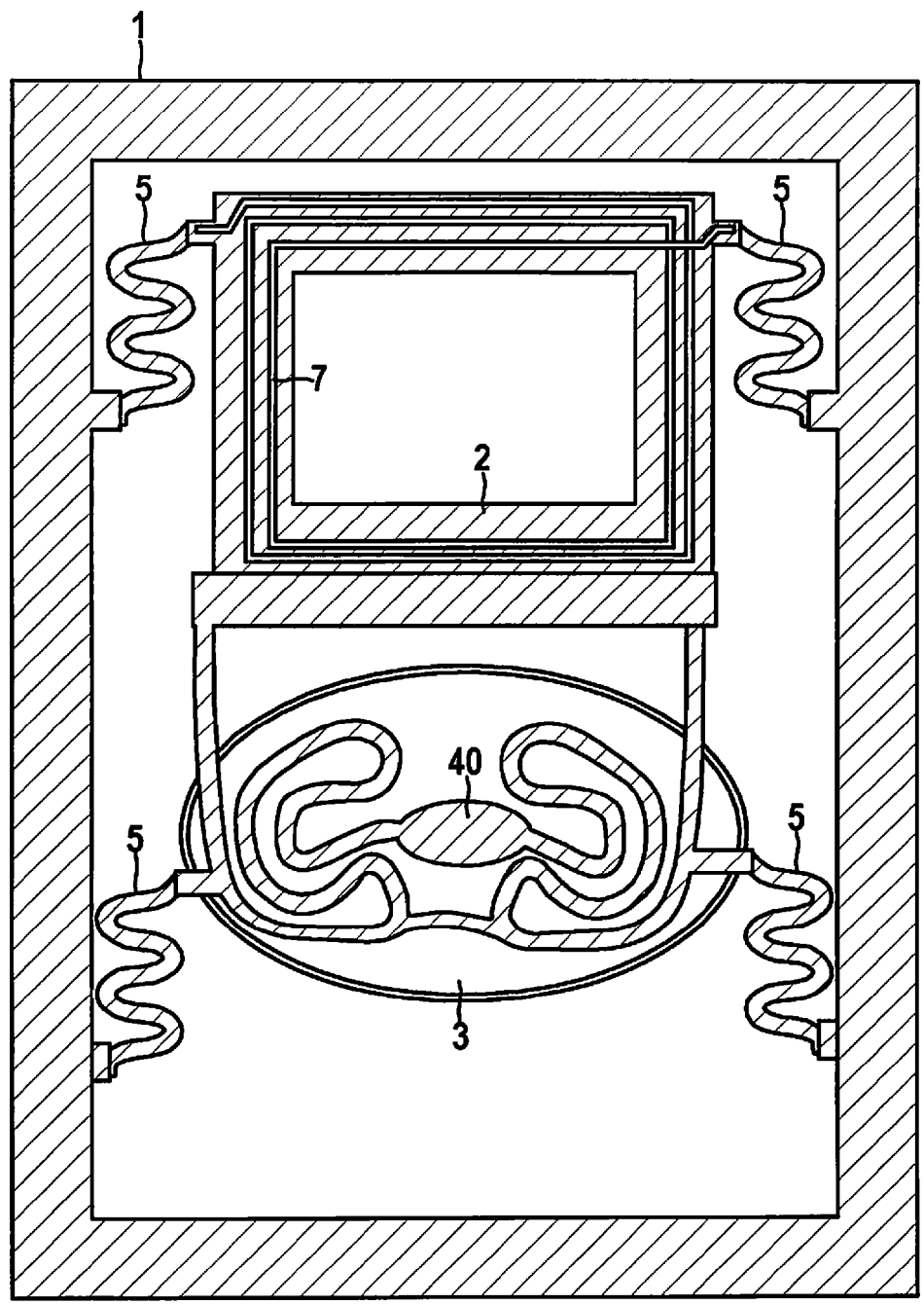
FIG. 21 shows a schematic representation of a specific embodiment of a mirror system according to the present invention.

FIG. 21 shows a schematic representation of a specific embodiment of a mirror system S according to the present invention.

Connecting element 14, which, in FIG. 3, couples spring arms 4a-4d to coil 20, is eliminated in FIG. 21. Spring arms 4a-4d extend directly from region 40 to coil form 2.

In one variant, spring arms 4a-4d, shown in image 21, may be replaced by a leaf spring, for example.

Figure 22:
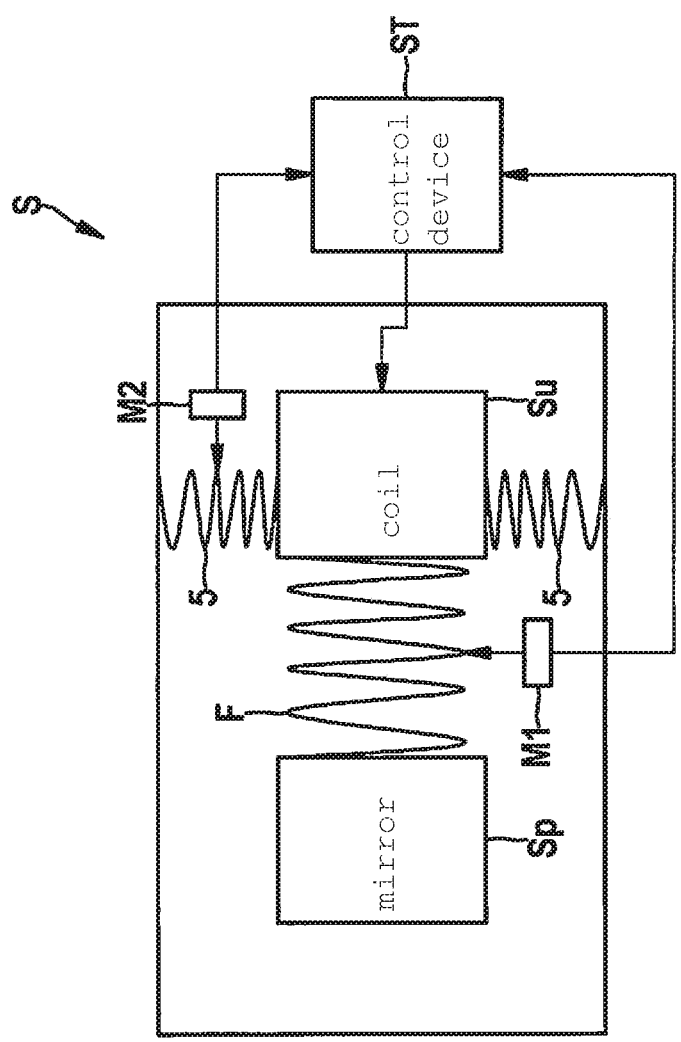
FIG. 22 shows a schematic representation of a specific embodiment of a mirror system according to the present invention.

FIG. 22 shows a schematic representation of a specific embodiment of a mirror system S according to the present invention that is based on mirror system S of FIG. 1.

In addition, mirror system S has two second springs 5 which connect the coil to the packaging. Positioned on first coil F is a first measuring device M1 which records the movement of mirror Sp. Also positioned on one of second coils 5 is a second measuring device M2 which records the elongation or movement of the second coil and thus the movement of the singly resonant system composed of coil Su, spring F and mirror Sp. First and second measuring device M1, M2 are coupled to a control device ST that controls coil Su in response to the measured values of the first and second measuring device M1, M2.

Although the present invention is described above on the basis of preferred exemplary embodiments, it is not limited thereto, but rather may be modified in numerous ways. In particular, the present invention may be modified in various ways without departing from the spirit and scope thereof.

What is claimed is:

1. A mirror system, comprising:
   a mirror that is mounted in a manner that permits oscillation;
   a coil;
   at least one first spring that intercouples the mirror and the coil in a way that allows the coil to be configured as a counterweight to the oscillating mirror.

2. The mirror system as recited in claim 1, wherein:
   the mirror is designed to oscillate rotationally; and
   the at least one first spring couples the mirror and the coil in a way that allows the coil to oscillate counter to a moving direction of the mirror.

3. The mirror system as recited in claim 2, further comprising:
   a frame;
   at least one second spring that is flexurally weak or soft, that couples the frame to at least one of the mirror, and the coil, and the at least one first spring.

4. The mirror system as recited in claim 3, further comprising:
   at least one second measuring device, the at least one second measuring device including at least one piezoresistive resistor that is designed for capturing a deflection of a group composed of at least one of the mirror, the coil, and the at least one first spring, and that is mounted on the at least one second spring.

5. The mirror system as recited in claim 4, further comprising:
   a control device that is designed, on the basis of measured values of the at least one second measuring device, to control the coil in a way that allows the group composed of at least one of the mirror, the coil, and the at least one first spring, to be excited with a predefined frequency, or the coil to be controlled in a way that allows external excitations to be actively counteracted.

6. The mirror system as recited in claim 1, wherein the coil has a coil form, the coil form having a cavity and a coil winding that is configured on the coil form.

7. The mirror system as recited in claim 1, wherein the at least one first spring and the coil are configured in a first plane, and the mirror is configured above the first plane in a second plane that is disposed parallel to the first plane, the mirror being coupled via a web f a predetermined length to the at least one first spring.

8. The mirror system as recited in claim 7, wherein the at least one first spring has one of: i) four spring arms which are configured in a meander shape and are coupled at one end thereof to the web, or ii) two spring arms that are circular in shape and are coupled at one end thereof to the web, and wherein one of: i) the spring arms at the other end thereof being coupled to a connecting element that couples the at least one first spring to the coil, or ii) the spring arms at the other end thereof being directly coupled to the coil.

9. The mirror system as recited in claim 7, further comprising:
   a housing that surrounds at least the mirror, the coil and the at least one first spring, the housing having a lower air pressure than an ambient environment around the housing, the housing having a partial vacuum, and being hermetically tightly sealed.

10. The mirror system as recited in claim 9, wherein the housing, disposed over the mirror, one of: i) is at least partially transmissive to laser beams, or ii) has a window above the mirror, the window being positioned obliquely relative to the first plane or the second plane and is transmissive to laser beams.

11. The mirror system as recited in claim 9, further comprising:
   a permanent magnet that is configured on the housing in a way that allows the coil to reside in a magnetic field of the magnet.

12. The mirror system as recited in claim 11, further comprising:
   a flux deflector that is configured on the magnet in a way that allows the magnetic field of the magnet to permeate the first plane in the area of the coil nearly vertically or nearly horizontally.

13. The mirror system as recited in claim 1, further comprising:
   at least one first measuring device, the at least one first measuring device including at least one piezoresistive resistor that is designed for capturing a deflection of the mirror, and which is mounted on the at least one first spring.

14. The mirror system as recited in claim 13, further comprising:
   a control device that is designed, on the basis of measured values of the at least one second measuring device, to control the coil in a way that allows the group composed of at least one of the mirror, the coil, and the at least one first spring, to be excited with a predefined frequency, or the coil to be controlled in a way that allows external excitations to be actively counteracted.

15. The mirror system as recited in claim 1, wherein the mirror has a base plate on whose top side, the mirror surface is configured and, on whose bottom side, a stiffening element is configured that is designed for mechanically stabilizing the mirror.

16. A projection device, comprising:
a light source;
a mirror system, including a mirror that is mounted in a manner that permits oscillation, a coil, and at least one first spring that intercouples the mirror and the coil in a way that allows the coil to be configured as a counterweight to the oscillating mirror; and
a control to control the at least one mirror system.

\* \* \* \* \*